United States Patent
Bohm et al.

(10) Patent No.: US 7,786,818 B2
(45) Date of Patent: Aug. 31, 2010

(54) ELECTRONIC COMPONENT COMPRISING A MODULATOR

(75) Inventors: Markus Bohm, Uttenreuth (DE); Walter Fix, Nuremberg (DE); Andreas Ullmann, Zirndorf (DE)

(73) Assignee: PolyIC GmbH & Co. KG, Furth (DE)

( * ) Notice: Subject to any disclaimer, the term of this patent is extended or adjusted under 35 U.S.C. 154(b) by 597 days.

(21) Appl. No.: 11/721,284

(22) PCT Filed: Dec. 6, 2005

(86) PCT No.: PCT/DE2005/002196
§ 371 (c)(1), (2), (4) Date: Sep. 20, 2007

(87) PCT Pub. No.: WO2006/061001
PCT Pub. Date: Jun. 15, 2006

(65) Prior Publication Data
US 2008/0218315 A1 Sep. 11, 2008

(51) Int. Cl.
*H03K 7/02* (2006.01)
(52) U.S. Cl. ............ 332/116; 332/115; 375/353
(58) Field of Classification Search .......... 332/106, 332/115, 116; 375/353
See application file for complete search history.

(56) References Cited

U.S. PATENT DOCUMENTS

| 5,528,222 | A | 6/1996 | Moskowitz et al. |
| 7,679,110 | B2 * | 3/2010 | Armgarth et al. ......... 257/253 |

FOREIGN PATENT DOCUMENTS

| DE | 2102735 | 8/1972 |
|---|---|---|
| DE | 33 38 597 | 5/1985 |
| DE | 41 03 675 | 8/1992 |
| DE | 692 32 740 T2 | 4/1993 |
| DE | 42 43 832 | 6/1994 |
| DE | 43 12 766 | 10/1994 |
| DE | 196 29 291 | 1/1997 |
| DE | 195 06 907 | 9/1998 |
| DE | 198 52 312 | 5/1999 |
| DE | 198 16 860 | 11/1999 |
| DE | 199 18 193 | 11/1999 |
| DE | 198 51 703 | 5/2000 |
| DE | 100 06 257 | 9/2000 |
| DE | 199 21 024 | 11/2000 |
| DE | 199 33 757 | 1/2001 |

(Continued)

OTHER PUBLICATIONS

Angelopoulos M et al., "In-Situ Radiation Induced Doping", Mol. Crystl. Liq. Cryst., 1990, vol. 189, pp. 221-225.

(Continued)

*Primary Examiner*—David Mis
(74) *Attorney, Agent, or Firm*—Carella, Byrne et al.; Elliot M. Olstein; William Squire

(57) ABSTRACT

An electronic component includes an RFID transponder, and also a security document comprises such an electronic component. The electronic component has a modulator for modulating a carrier signal, the modulator being constructed from at least two organic field effect transistors.

16 Claims, 4 Drawing Sheets

FOREIGN PATENT DOCUMENTS

| | | |
|---|---|---|
| DE | 695 19 782 | 1/2001 |
| DE | 199 35 527 | 2/2001 |
| DE | 199 37 262 | 3/2001 |
| DE | 100 12 204 | 9/2001 |
| DE | 100 33 112 | 1/2002 |
| DE | 201 11 825 | 2/2002 |
| DE | 100 43 204 | 4/2002 |
| DE | 100 45 192 | 4/2002 |
| DE | 100 47 171 | 4/2002 |
| DE | 100 58 559 | 5/2002 |
| DE | 100 61 297 | 6/2002 |
| DE | 101 17 663 | 10/2002 |
| DE | 101 20 687 | 10/2002 |
| DE | 101 20 686 | 11/2002 |
| DE | 101 51 440 | 2/2003 |
| DE | 10151440 C1 | 2/2003 |
| DE | 101 41 440 | 3/2003 |
| DE | 101 63 267 | 7/2003 |
| DE | 102 09 400 | 10/2003 |
| DE | 102 19 905 | 12/2003 |
| DE | 103 41 962 | 4/2004 |
| DE | 02079791 T1 | 4/2004 |
| DE | 699 13 745 | 10/2004 |
| DE | 69830846 T2 | 5/2006 |
| EP | 0 108 650 | 5/1984 |
| EP | 0 128 529 | 12/1984 |
| EP | 0 268 370 A2 | 5/1988 |
| EP | 0 268 370 A3 | 5/1988 |
| EP | 0 350 179 | 1/1990 |
| EP | 0 418 504 | 3/1991 |
| EP | 0 442 123 | 8/1991 |
| EP | 0 460 242 | 12/1991 |
| EP | 0 501 456 A2 | 9/1992 |
| EP | 0 501 456 A3 | 9/1992 |
| EP | 0 511 807 | 11/1992 |
| EP | 0 528 662 | 2/1993 |
| EP | 0 603 939 A2 | 6/1994 |
| EP | 0 615 256 | 9/1994 |
| EP | 0 685 985 | 12/1995 |
| EP | 0 716 458 A2 | 6/1996 |
| EP | 0 716 458 A3 | 6/1996 |
| EP | 0 785 578 A2 | 7/1997 |
| EP | 0 785 578 A3 | 7/1997 |
| EP | 0 786 820 | 7/1997 |
| EP | 0 690 457 | 12/1999 |
| EP | 0 962 984 A2 | 12/1999 |
| EP | 0 962 984 A3 | 12/1999 |
| EP | 0 966 182 | 12/1999 |
| EP | 0 979 715 | 2/2000 |
| EP | 0 981 165 | 2/2000 |
| EP | 0 989 614 A2 | 3/2000 |
| EP | 1 048 912 | 11/2000 |
| EP | 1 052 594 | 11/2000 |
| EP | 1 065 725 A2 | 1/2001 |
| EP | 1 065 725 A3 | 1/2001 |
| EP | 1 083 775 | 3/2001 |
| EP | 1 102 335 A2 | 5/2001 |
| EP | 1 103 916 | 5/2001 |
| EP | 1 104 035 A2 | 5/2001 |
| EP | 1 113 502 | 7/2001 |
| EP | 1 134 694 | 9/2001 |
| EP | 1 170 851 | 1/2002 |
| EP | 1 224 999 | 7/2002 |
| EP | 1 237 207 | 9/2002 |
| EP | 1 296 280 | 3/2003 |
| EP | 1 318 084 | 6/2003 |
| EP | 1431910 A1 | 6/2004 |
| FR | 2793089 | 11/2000 |
| FR | 2 853 479 | 10/2004 |
| GB | 723598 | 2/1955 |
| GB | 2 058 462 | 4/1981 |
| JP | 54069392 | 6/1979 |
| JP | 60117769 | 6/1985 |
| JP | 61001060 | 1/1986 |
| JP | 61167854 | 7/1986 |
| JP | 62065472 A | 3/1987 |
| JP | 362065477 A | 3/1987 |
| JP | 63205943 | 8/1988 |
| JP | 01169942 | 7/1989 |
| JP | 2969184 | 12/1991 |
| JP | 03290976 A | 12/1991 |
| JP | 05152560 | 6/1993 |
| JP | 05259434 | 10/1993 |
| JP | 05347422 | 12/1993 |
| JP | 08197788 | 8/1995 |
| JP | 09083040 | 3/1997 |
| JP | 09320760 | 12/1997 |
| JP | 10026934 | 1/1998 |
| JP | 2001085272 | 3/2001 |
| WO | WO 93/16491 | 8/1993 |
| WO | WO 94/17556 | 8/1994 |
| WO | WO 95/06240 | 3/1995 |
| WO | WO 95/31831 | 11/1995 |
| WO | WO 96/02924 | 2/1996 |
| WO | WO 96/19792 | 6/1996 |
| WO | WO 97/12349 | 4/1997 |
| WO | WO 97/18944 | 5/1997 |
| WO | WO 98/18156 | 4/1998 |
| WO | WO 98/18186 | 4/1998 |
| WO | WO 98/40930 | 9/1998 |
| WO | WO 99/07189 | 2/1999 |
| WO | WO 99/10929 | 3/1999 |
| WO | WO 99/10939 | 3/1999 |
| WO | WO 99/21233 | 4/1999 |
| WO | WO 99/30432 | 6/1999 |
| WO | WO 99/39373 | 8/1999 |
| WO | WO 99/40631 | 8/1999 |
| WO | WO 99/53371 | 10/1999 |
| WO | WO 99/54842 | 10/1999 |
| WO | WO 99/54936 | 10/1999 |
| WO | WO 99/66540 | 12/1999 |
| WO | WO 00/07151 | 2/2000 |
| WO | WO 00/33063 | 6/2000 |
| WO | WO 00/36666 | 6/2000 |
| WO | 0070552 A1 | 11/2000 |
| WO | WO 00/79617 | 12/2000 |
| WO | WO 01/03126 | 1/2001 |
| WO | WO 01/06442 | 1/2001 |
| WO | WO 01/08241 | 2/2001 |
| WO | WO 01/15233 | 3/2001 |
| WO | WO 01/17029 | 3/2001 |
| WO | WO 01/17041 | 3/2001 |
| WO | WO 01/27998 | 4/2001 |
| WO | WO 01/46987 | 6/2001 |
| WO | WO 01/47044 A2 | 6/2001 |
| WO | WO 01/47044 A3 | 6/2001 |
| WO | WO 01/47045 | 6/2001 |
| WO | WO 01/69517 | 9/2001 |
| WO | WO 01/73109 A2 | 10/2001 |
| WO | WO 01/73109 A3 | 10/2001 |
| WO | WO 02/05360 | 1/2002 |
| WO | WO 02/05361 | 1/2002 |
| WO | WO 02/15264 | 2/2002 |
| WO | WO 02/17233 | 2/2002 |
| WO | WO 02/19443 | 3/2002 |
| WO | WO 02/21612 | 3/2002 |
| WO | WO 02/29912 | 4/2002 |
| WO | WO 02/43071 | 5/2002 |
| WO | WO 02/47183 | 6/2002 |
| WO | WO 02/065557 A1 | 8/2002 |
| WO | WO 02/71139 | 9/2002 |
| WO | WO 02/71505 | 9/2002 |
| WO | WO 02/76924 | 10/2002 |
| WO | WO 02/091495 A2 | 11/2002 |

| | | |
|---|---|---|
| WO | WO 02/091495 A3 | 11/2002 |
| WO | WO 02/095805 A2 | 11/2002 |
| WO | WO 02/095805 A3 | 11/2002 |
| WO | WO 02/099907 | 12/2002 |
| WO | WO 02/099908 | 12/2002 |
| WO | WO 03/027948 | 4/2003 |
| WO | WO 03/036686 | 5/2003 |
| WO | WO 03/038897 | 5/2003 |
| WO | WO 03/046922 | 6/2003 |
| WO | WO 03/057501 | 7/2003 |
| WO | WO 03/067680 | 8/2003 |
| WO | WO 03/069552 | 8/2003 |
| WO | WO 03/081671 | 10/2003 |
| WO | WO 03/095175 | 11/2003 |
| WO | WO 2004/032257 | 4/2004 |
| WO | WO 2004/042837 A2 | 5/2004 |
| WO | WO 2004/042837 A3 | 5/2004 |
| WO | WO 2004/047144 A2 | 6/2004 |
| WO | WO 2004/047144 A3 | 6/2004 |
| WO | WO 2004/047194 A2 | 6/2004 |
| WO | WO 2004/047194 A3 | 6/2004 |
| WO | WO 2004/083859 | 9/2004 |
| WO | 2004093341 | 10/2004 |
| WO | WO 2005/004194 | 1/2005 |

OTHER PUBLICATIONS

Bao, Z. et al., "High-Performance Plastic Transistors Fabricatecd by Printing Techniques", Chem. Mater vol. 9, No. 6, 1997, pp. 1299-1301.

Baude P F et al, "Organic semiconductor RFID transponsers" International Electron Devices Metting 2003. IEDM. Technical Digest. Washington, DC, Dec. 8-10, 2003, New York NY, IEEE, US Dec. 8, 2003, pp. 191-194.

Belloni, F. et al, "Parameters Optimization for Improved Dynamics of Voltage Multipliers for Space", 2004 35$^{th}$ Annual IEEE Electronics Specialists Conference, Aachen, Germany, 2004, pp. 439-442.

Brabec, C.J. et al, "Photoinduced FT-IR spectroscopy and CW-photocurrent measurements of conjugated polymers and fullerenes blended into a conventional polymer matrix", Solar Energy Materials and Solar Cells, 2000 Elsevier Science V.V., pp. 19-33.

Brabec, C.J. et al., "Photovoltaic properties of a conjugated polymer/methanofullerene composites embedded in a polystyrene matrix", Journal of Applied Physics, vol. 85, No. 9, 1999, pp. 6866-6872.

Braun D., et al, "Visible light emission from semiconducting polymer diodes", American Institute of Physics, Applied Physics Letters 58, May 6, 1991, pp. 1982-1984.

Brown, A.R. et al., "Field-effect transistors made from solution-processed organic semiconductors", Elsevier Science, S.A., Synthetic Metals 88 (1997) pp. 37-55.

Brown, A.R., "Logic Gates Made from Polymer Transistors and Their Use in Ring Oscillators", Science, vol. 270, Nov. 10, 1995, pp. 972-974.

Chen, X.L. et al., "Morphological and Transistor Studies of Organic Molecular Semiconductors with Anisotropic Electrical Characteristics", American Chemical Society, 2001, Chem. Mater. 2001, 13, 1341-1348.

Clemens, W. et al., "Vom Organischen Transistor Zum Plastik-Chip," Physik Journal, V. 2, 2003, pp. 31-36.

Collet J. et al:, 'Low Voltage, 30 NM Channel Length, Organic Transistors With a Self-Assembled Monolayer as Gate Insulating Films:, Applied Physics Letters, American Institute of Physics. New York, US, Bd 76, Nr. 14, Apr. 3, 2000, Seiten 1941-1943, XP000950589, ISSN:0003-6951, das ganze Dokument.

Cox, Robert W. et al., "A Minimally Intrusive, Low Cost System for Determining Indoor Air Flow Patterns", Computers in Power Electronics, 2004. IEEE Workshop on Urbana, IL Aug. 15-18, 2004, Piscataway, NJ, IEEE, Aug. 15, 2004, pp. 63-68.

Crone, B. et al, "Large-scale complementary Integrated circuits based on Organic transistors", Nature, vol. 403, Feb. 3, 2000, pp. 521-.

Crone B. K. et al., "Design and Fabrication of Organic Complementary Circuits", J. Appl. Phys. vol. 89, May 2001, pp. 5125-5132.

Dai, L. et al, Photochemical Generation of Conducting Pattersn in Polybutadiene Films:, Macromolecules, vol. 29, No. 1, 1996, pp. 282-287, XP 001042019, the whole document.

Dai, L. et al., "Conjugation of Polydienes by Oxidants Other Than Iodine", Elsevier Science S.A., Synthetic Metals 86 (1997) 1893-1894.

Dai, L. et al., "$I_2$-Doping", Elsevier Science S.A., Synthetic Metals 69 (1995), pp. 563-566.

Drury et al., "Low-Cost All-Polymer Integrated Circuits", American Institute of Physics, Applied Physics Letters, 1998, vol. 73, No. 1, pp. 108-110, Jul. 6, 1998.

Ficker, J. et al., "Dynamic and Lifetime Measurements of Polymer OFETS and Integrated Plastic Circuits," Proc. Of SPIE, v. 466, 2001, pp. 95-102.

Fix, W. et al., "Fast Polymer Integrated Circuits Based on a Polyfluorene Derivative", ESSDERC 2002, 2002, pp. 527-529.

Fix, W., et al., "Fast polymer integrated circuits", American Institute of Physics, Applied Physics Letters, vol. 81, No. 89, Aug. 2002, pp. 1735-1737.

Forrest et al.: "The Dawn of Organic Electronics", IEEE Spectrum, Aug. 2000, Seiten 29-34, XP002189000, IEEE Inc., New York, US ISSN:0018-9235, Seite 33, rechte Spalte, Zelle 58-Seite 34, linke Spalte, Zeile 24; Abbildung 5.

Garbassi F., et al., "Bulk Modifications", Polymer Surfaces, John Wiley & Sons, 1998, pp. 289-300.

Garnier, F. et al, "All-Polymer Field-Effect Transistor Realized by Printing Techniques", Science, American Association for the Advancement of Science, US, vol. 265, Sep. 16, 1994, pp. 1684-1686.

Gelinck, G.H. et al., "High-Performance All-Polymer Integrated Circuits", Applied Physics Letters, v. 77, 2000, pp. 1487-1489.

Goncalves_Conto, Sylvie, et al., "Interface Morphology in Organic Light-Emitting Diodes", Advanced Materials 1999, vol. 11, No. 2, pp. 112-115.

Gosain, D.P., "Excimer laser crystallized poly-Si TFT's on plastic substrates", Second International Symposium on Laser Precision Microfabrication, May 16-18, 2001, Singapore, vol. 4426, pp. 394-400.

Halls, J.J. M., et al., "Efficient photodiodes from interpenetrating polymer networks", Nature, vol. 376, Aug. 10, 1995, pp. 498-500.

Harsanyi G. et al., "Polytronics for biogtronics:unique possibilities of polymers in biosensors and BioMEMS", IEEE Polytronic 2002 Conference, Jun. 23, 2002, pp. 211-215.

Hart, C.M. et al, "Low-cost all-polymer integrated circuits", Solid-State Circuits Conference, 1998. EXXCIRC '98 Proceedings of the 24$^{th}$ European, The Hague, The Netherlands Sep. 22-24, 1998, Piscataway, NJ, USA, IEEE, Sep. 22, 1998, pp. 30-34.

Hebner, T.R. et al., Ink-jet printing of doped polymers for organic light emitting devices:, American Institute of Physics, Applied Physics Letters, vol. 72, No. 5, Feb. 2, 1998, pp. 519-521.

Hergel, H. J.: "Pld-Programmiertechnologien", Elektronik, Franzis Verlag GMBH. Munchen, DE, Bd 41, Nr. 5, Mar. 3, 1992, Seiten 44-46, XP000293121, ISSN: 0013-5658, Abbildungen 1-3.

Hwang J D et al:, "A Vertical Submicron Slc thin film transistor", Solid State Electronics, Elsevier Science Publishers, Barking, GB, Bd. 38, NR. 2, Feb. 1, 1995, Seiten 275-278, XP004014040, ISSN:0038-1101, Abbildung 2.

IBM Technical Disclosure Bulletin, "Short-Channel Field-Effect Transistor", IBM Corp., New York, US, Bd. 32, Nr. 3A, Aug. 1, 1989, Seiten 77-78, XP000049357, ISSN:0018-8689, das ganze Dokument.

Kawase, T., et al., "Inkjet Printed Via-Hole Interconnections and Resistors for All-Polymer Transistor Circuits", Advanced Materials 2001, 13, No. 21, Nov. 2, 2001, pp. 1601-1605.

Klauk, H. et al., "Pentacene Thin Film Transistors and Inverter Circuits", 1997 International Exectron Devices Meeting Technical Digest, pp. 539-542, Dec. 1997.

Kobel W. et al., "Generation of Micropatterns in Poly (3-Methyl-Thiophene) Films Using Microlithography: A First Step in the Design of an All-Organic Thin-Film Transistor" Synthetic Metals, V. 22, 1988, pp. 265-271.

Koezuka, H. et al., "Macromolecular Electronic Device", Mol. Cryst. Liq. Cryst. 1994, vol. 2555, pp. 221-230.

Lidzey, D. G. et al., "Photoprocessed and Micropatterned Conjugated Polymer LEDs", Synthetic Metals, V. 82, 1996, pp. 141-148.

Lowe, J. et al., "Poly(3-(2-Acetoxyethyl)Thiophene): A Model Polymer for Acid-Catalyzed Lithography", Synthetic Metals, Elsevier Sequoia, Lausanne, CH, Bd. 85, 1997, Seiten 1427-1430.

Lu, Wen et al., "Use of Ionic Liquids for π-Conjugated Polymer Electrochemical Devices", Science, vol. 297, 2002, pp. 983-987/.

Manuelli, Alessandro et al., "Applicability of Coating Techniques for the Production of Organic Field Effect Transistors", IEEE Polytronic 2002 Conference, 2002, pp. 201-204.

Oelkrug, D. et al., "Electronic spectra of self-organized oligothiophene films with 'standing' and 'lying' molecular units", Elsevier Science S.A., 1996, Thin Solid Films 284-270.

Qiao, X. et al. "The FeCl3-doped poly3-alkithiophenes) in solid state", Elsevier Science, Synthetic Metals 122 (2001) pp. 449-454.

Redecker, M. et al., "Mobility enhancement through homogeneous nematic alignment of a liquid-crystalline polyfluorene", 1999 American Institute of Physics, Applied Physics Letters, vol. 74, No. 10, pp. 1400-1402.

Rogers J A et al:, "Low-Voltage 0.1 Mum Organic Transistors and Complementary Inverter Circuits Fabricated with a Low-Cost Form of Near-Field Photolithography", Applied Physics Letters, American Institute of Physics. New York, US, Bd. 75, Nr. 7, Aug. 16, 1999, Seiten 1010-1012, XP000934355, ISSN:003-6951; das ganze Dokument.

Rogers, J. A. et al:, "Printing Process Suitable for Reel-to-Reel Production of High-Performance Organic Transistors and Circuits", Advanced Materials, VCH, Verlagsgesellschaft, Weinheim, DE, Bd. 11, Nr. 9, Jul. 5, 1999, Seiten 741-745, P000851834, ISSN: 0935-9648, das ganze Dokument.

Rost, Henning et al., "All-Polymer Organic Field Effect Transistors", Proc. Mat. Week, CD, 2001, pp. 1-6.

Sandberg, H. et al., "Ultra-thin Organic Films for Field Effect Transistors", SPIE vol. 4466, 2001, pp. 35-43.

Shaheen, S.E., et al., "Low band-gap polymeric photovoltaic devices", Synthetic Metals, vol. 121, 2001, pp. 1583-1584.

Ullman, A. et al., "High Performance Organic Field-Effect Transistors and Integrated Inverters", Mat. Res. Soc. Symp. Proc., v. 665, 2001, pp. 265-270.

Velu, G. et al. "Low Driving Voltages and Memory Effect in Organic Thin-Film Transistors With A Ferroelectric Gate Insulator", Applied Physics Letters, American Institute of Physics, New York, Vo.I 79, No. 5, 2001, pp. 659-661.

Wang, Hsing et al., "Conducting Polymer Blends: Polythiophene and Polypyrrole Blends with Polystyrene and Poly(bisphenol A carbonate)", Macromolecules, 1990, vol. 23, pp. 1053-1059.

Wang, Yading et al., "Electrically Conductive Semiinterpenetrating Polymer Networks of Poly(3-octylthiophene)", Macromolecules 1992, vol. 25, pp. 3284-3290.

Yu, G. et al., "Dual-function semiconducting polymer devices: Light-emitting and photodetecting diodes", American Institute of Physics, Applied Physics Letter 64, Mar. 21, 1994, pp. 1540-1542.

Zangara L., "Metall Statt Halbleiter, Programmierung Von Embedded ROMS Ueber Die Metallisierungen", Elektronik, Franzis Verlag GmbH, Munchen, DE, vol. 47, No. 16, Aug. 4, 1998, pp. 52-55.

Zheng, Xiang-Yang et al., "Electrochemical Patterning of the Surface of Insulators with Electrically Conductive Polymers", J. Electrochem. Soc., v. 142, 1995, pp. L226-L227.

Baude, Paul F. et al., "Organic Semiconductor RFID Transponders", International Electron Devices Meeting 2003. IEDM. Technical Digest. Washington, DC, Dec. 8-10, 2003, New York, NY.

Hart, CM et al.,; "Low-cost all-polymer integrated circuits", Solid-State Circuits Conference, 1998. ESSCIRC '98 Proceedings of the 24th European, The Hague, The Netherlands Sep. 22-24, 1998, Piscataway, NJ, USA.

* cited by examiner

ELECTRONIC COMPONENT COMPRISING A MODULATOR

The invention relates to an electronic component comprising a modulator for modulating a carrier signal.

RFID transponders (RFID=Radio Frequency Identification) are increasingly being employed for providing merchandise, articles or security documents with information that can be read out electronically. They are thus being employed for example as electronic bar code for consumer goods, as luggage tag for identifying luggage or as security element that is incorporated into the binding of a passport and stores authentication information.

In this case, RFID transponders are usually constructed in the manner described in U.S. Pat. No. 5,528,22, for example.

The RFID transponder essentially comprises two components, an antenna and a silicon chip. Antenna and silicon chip are mounted on a common carrier substrate and electrically connected to one another by means of contact-connections. The RF carrier transmitted by a base station is fed back to the base station and in this case an additional item of information is modulated onto the fed back signal in accordance with a preprogrammed information protocol.

Furthermore, WO 99/30432 describes an RFID transponder having an integrated circuit constructed substantially from organic material, said integrated circuit providing the function of an ID code generator. The RFID transponder is constructed from electrical components based on conventional silicon technology, e.g. a rectifier diode, and from organic semiconductor components, the ID code generator IC (IC=Integrated Circuit).

Furthermore, DE 101 41 440 C1 describes an RFID transponder constructed—with the exception of the antenna—substantially from organic components.

In these RFID transponders, the carrier signal emitted by a base station is coupled into an antenna resonant circuit of the RFID transponder and the induced voltage is then rectified. The rectified voltage supplies a logic IC of the RFID transponder that drives a modulation transistor. The modulation transistor is driven by the logic IC with a binary signal containing a bit sequence, so that the attenuation of the resonant circuit is modulated according to the binary signal. The antenna's radiating behavior that changes as a result of this is detected by the base station and acquired as response signal of the RFID transponder.

The advantage of such an RFID transponder is that electronic components based on organic electronics (plastic electronics) can be produced at significantly lesser expense, such that RFID transponders can be used for extremely inexpensive applications. RFID transponders, for example as electronic radio labels, can thus form a replacement for the bar code.

However, organic circuits are significantly slower than conventional silicon based circuits. The basic building blocks of organic circuits are organic field effect transistors, so-called OFETs. These transistors are based on the principle of charge carrier accumulation rather than on the principle of charge carrier invasion, which results in a low switching speeds in comparison with the silicon transistors and a different switching behavior (e.g. unsuitability for AC voltage). These properties discourage the use of such transistors in traditional multistep modulation methods.

It is an object of the present invention, then, to specify an improved device for effective and reliable modulation of a carrier signal, in particular for organic RFID transponders.

According to the invention, this object is achieved by an electronic component, in particular an RFID transponder, which has a modulator for modulating a carrier signal that is formed from at least two organic field effect transistors (72, 73).

In this case, the invention is based on the insight that, by means of two or more organic field effect transistors, novel modulators for modulating a carrier signal can be created which utilize the particular properties and the particular switching behavior of organic field effect transistors for the modulation of the carrier signal. The invention makes it possible, with extremely low component outlay, to realize powerful multistep modulation methods and thus to increase the amount of information that can be transmitted.

An organic field effect transistor, referred to as OFET hereinafter, has at least three electrodes, an organic semiconductor layer, and an insulating layer. The OFET is arranged on a carrier substrate, which may be formed as a polymer film. A substrate composed of an organic semiconductor forms a conductive channel, the end sections of which are formed by a source electrode and a drain electrode. The conductive channel is covered with an insulation layer, on which a gate electrode is arranged. The conductivity of the conductive channel can be altered by application of a gate-source voltage $U_{GS}$ between gate electrode and source electrode. In the case of organic semiconductors, this effect is based essentially on so-called hole conduction, "holes" in the crystal lattice that serve as charge carriers being densified if a drain source voltage $U_{DS}$ is applied between the source electrode and the drain electrode. The electrical conductivity consequently rises between the drain electrode and the source electrode, in which case the achievable reverse and forward resistances of an OFET subsequently also differ significantly from those of a transistor created using traditional silicon technology, on account of the different functional principle of an OFET.

The organic semiconductor layer comprises for example conjugated polymers, such as polythiophenes, polythienylenevinylenes or polyfluorene derivatives, which are applied from solution by spin-coating, blade coating or printing. So-called "small molecules", i.e. oligomers such as sexithiophene or pentacene, which are vapor-deposited by a vacuum technique, are also suitable as organic semiconductor layer.

It is provided that the at least two OFETs form a variable load for modulation of the carrier signal. In this way, two or more bits can be transmitted simultaneously since even two OFETs of the same type can assume three states if they are connected in parallel. The first state is brought about by neither of the two OFETs being driven, with the result that a total resistance that is equal to half the reverse resistance of one OFET is formed. The second state is brought about by one of the two OFETs being driven. In this way, the resistance of said one OFET decreases to a forward resistance. The total resistance of the two OFETs is the product of both resistances divided by the sum of both resistances and, owing to the reduced resistance of said one OFET, is therefore lower than in the first state described above. The third state is brought about, then, by both OFETs being driven. The total resistance of the two OFETs is then equal to half the forward resistance of one OFET.

The gain in transmittable information that is achieved by means of the invention can be utilized in this case for increasing the data rate transmitted via the air interface, for synchronization purposes or for error detection/correction—depending on the coding system used.

The inventive circuit arrangement thus compensates for the disadvantage of the low switching frequency of OFETs by virtue of the simultaneously possible transmission of a plurality of bits and by virtue of the possibilities thus also opened up for parallel processing in an organic logic IC connected to the modulator.

Upon eliminating the disadvantages when using OFETs in RFID transponders, the advantages of OFETs are of particular significance. The fact that OFETs can be produced cost-effectively and in few work steps by means of a printing method means not only that the manufacturing costs are very low, but also that the development costs and the development time are reduced. It is also advantageous that the OFETs can be tailored individually to their purpose of use.

It is particularly advantageous to form the modulator with at least two differently formed OFETs. Thus, by way of example, two or more OFETs are connected up which have a different profile of the internal resistance and/or a different switching behavior. A bit in the code space can thus be assigned to the specific signal response of each of said OFETs to the change in the gate level from the low level to the high level (and also vice versa) itself. A superposition of these signal responses is obtained by connecting the different OFETs in parallel and/or in series, with the result that, when using n different OFETs, a character set of $2^n$ different characters can be obtained. It is particularly advantageous in this case if the differing properties of the OFETs and also the interconnection of the OFETs are chosen such that the summationally superposed signal responses represent mutually orthogonal functions.

Although the decoding of the information coded into the carrier signal by means of such a modulator requires a complex evaluation circuit, which can be realized only with difficulty by means of an organic circuit, in the case of an RFID transponder the return response of the RFID transponder is evaluated by the base station, in which an evaluation circuit in traditional silicon technology is then preferably used.

In order to form a modulator with at least two differently formed OFETs, provision may be made for forming the OFETs with different geometries, for example forming them with different channel lengths and/or different channel widths.

These parameters can easily be altered and be optimized in few steps according to the trial and error method owing to the easy produceability described further above.

Provision may also be made for forming the OFETs with different semiconductor layers, in particular for varying the channel thickness or for using a semiconductor material having a different conductivity or doping. In this case, too, changes are possible at short notice because the starting substances are available as pastes or inks.

These described variations of the construction of the OFETs make is possible to form the OFETs with a different switching behavior and profile of the internal resistance.

It is particularly advantageous if the at least two different OFETs have different internal resistances in the turned-on (forward resistance) and/or in the turned-off state (reverse resistance) and the OFETs are connected up to one another in parallel connection and/or in series connection.

In this case, it may be provided that the OFETs in a parallel connection form the variable load. A parallel connection of two OFETs having different forward resistances can already form four states, to be precise, as explained thoroughly further above, through a change in the total resistance of the two parallel-connected OFETs. A respectively different state can then be formed by the optional driving of the two OFETs since the two OFETs are then formed with a different forward resistance.

It may furthermore also be provided that the two or more OFETs are modulated differently with different gate voltages since the forward resistance of the OFET is dependent on the applied gate voltage.

The OFETs may also be formed with a different switching behavior by changing the geometry and/or the semiconductor material. It is thus furthermore possible to use OFETs which exhibit different edge shapes in the event of a change in the input signal and the edge shapes of which differ in particular in terms of their edge steepness. For fast OFETs, an almost rectangular switching profile is characteristic, that is to say that when the OFET is driven, it switches without significant delay from the low level to the high level, and vice versa. Slow OFETS, by contrast, switch with a delay. That is tantamount to an inclined switching edge. A slow OFET therefore has a more greatly inclined switching edge than a fast OFET. By means of two or more OFETs, it is possible in this way to form a switching edge with changing inclination and, under certain circumstances, switching edges that change in regions. The information is thus coded for example into the edge steepness of the edges (edge steepness modulation).

Furthermore, it is also possible to combine the modulation schemes described above.

As already described above, besides a parallel connection of the OFETs, it may also be provided that the OFETs are arranged in a series connection. Given Appropriate design, OFETs can also have a finite conductance in the off state, so that the states described further above for the parallel connection can also be assumed in a series connection of OFETs.

In accordance with one preferred exemplary embodiment of the invention, the electronic component furthermore has an organic binary logic circuit, the gates of the OFETs being connected to respectively assigned outputs of the organic logic circuit and the OFETs being driven by the binary logic circuit for the simultaneous transmission of two or more bits by means of a multistage modulatiuon method. If the OFETs are formed by n different OFETs, then the OFETs will be driven by the binary logic circuit for the simultaneous transmission of $2^n$ bits. In this way, by way of example, 8 bits can be transmitted simultaneously by means of 3 OFETs.

The modulator may be formed as a printed thin-film element on a carrier substrate, in particular a carrier film. Provision may be made for preferring carrier films because particularly robust RFID transponders which can be folded or bent in use can be produced in this way. Such a production process may be formed as a continuous roll-to-roll process.

However, it is also possible to provide a rigid substrate, for example a glass substrate.

In further embodiments, provision may be made for forming the modulator in optically transparent and/or optically invisible fashion. Such an embodiment may be particularly advantageous in conjunction with display elements or optical security elements.

It may be provided that the OFETs provided for the load modulation of the carrier signal are driven individually and/or jointly with an identical gate voltage corresponding to the high level of the logic assembly. In this way, the logic assembly for driving the modulator can be formed in a particularly simple manner.

It may also be provided that the OFETs for modulating the carrier signal are driven with different gate voltages. By way of example, it is thus possible to arrange a plurality of antennas designed for different frequency bands on an RFID transponder, which antennas are in each case connected to a rectifier and a capacitor for providing different supply potentials. The different supply voltage potentials provided are used for operating the logic assembly. Since different supply voltage potentials are available in the case of an electronic component of this type, it is possible in a simple manner for the OFETs used for modulating the carrier signal to be driven with different gate voltages.

The electronic component according to the invention may be for example part of a security document, ticket or merchandise label. Furthermore, it is also possible for an electronic component according to the invention not to provide the function of an RFID transponder, but rather any other function desired. Thus, it is possible for example, for the electronic component to comprise an oscillator that generates the carrier signal modulated by the modulator.

The invention will now be explained in more detail on the basis of a plurality of exemplary embodiments with the aid of the accompanying drawings.

Figure 1:
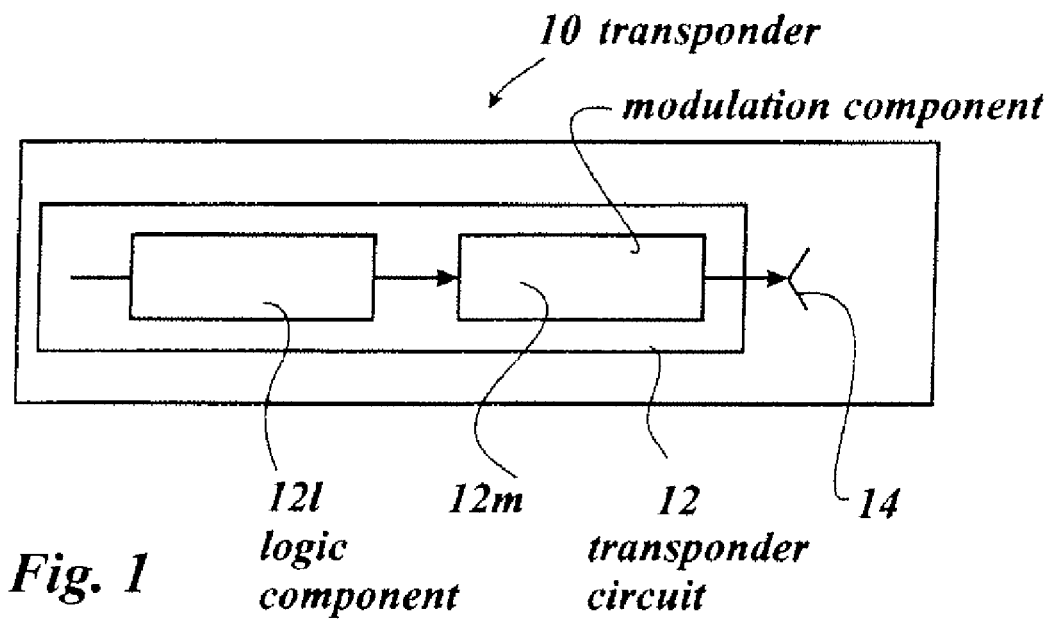
FIG. 1 shows a block diagram of a transponder circuit.

FIG. 1 shows a transponder 10 comprising a transponder circuit 12 and an antenna 14. The transponder circuit 12 is essentially formed from a logic component 12$l$ and a modulation component 12$m$. The transponder 10 is preferably formed as a transponder with organic electronic components, such as OFETs for example. The modulation component 12$m$ is referred to hereinafter as modulator.

The OFET is an organic field effect transistor having at least three electrodes and an insulating layer. The OFET is arranged on a carrier substrate, which may be formed as a film. A substrate composed of an organic semiconductor forms a conductive channel between a source electrode and a drain electrode. The conductive channel is covered with an insulation layer, on which a gate electrode is arranged. The conductivity of the conductive channel can be altered by application of a gate-source voltage $U_{GS}$ between gate electrode and source electrode. Consequently, the resistance between the drain electrode and the source electrode decreases after application of the gate-source voltage $U_{GS}$ and a current flow occurs between the source electrode and the drain electrode if a drain-source voltage $U_{DS}$ is applied. An OFET is therefore essentially a controllable resistor.

An item of binary information is stored in the logic component 12$l$ of the transponder illustrated in FIG. 1, said information being transmitted to the modulation component 12$m$ upon activation of the transponder 10, as a result of which the antenna 14 connected to the modulation component 12$m$ emits a signal modulated with the binary information. Said signal can be evaluated in a receiver and provides information about the identity of the object connected to the transponder 10. The object may be for example an item of merchandise or a security document.

Figure 2:
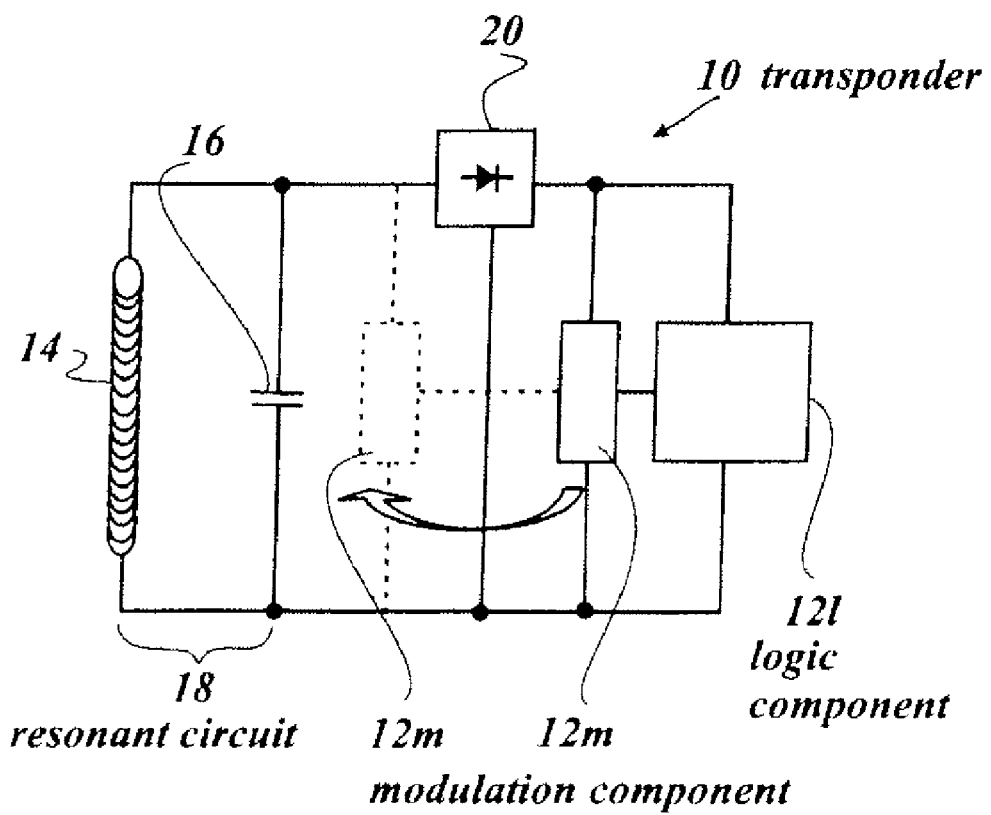
FIG. 2 shows a basic circuit diagram of a transponder circuit.

FIG. 2 then shows a circuit diagram of an exemplary embodiment of the transponder 10. Identical elements are designated by identical reference symbols. The antenna 14 forms together with a capacitor 16 an electrical resonant circuit 18 tuned to a carrier frequency. The resonant circuit 18 is connected to the input of a rectifier 20, as a result of which a DC voltage is provided at the output of the rectifier 20 if an electrical voltage is induced in the resonant circuit 18 by an electromagnetic field generated by an external transmitter. On the supply voltage side, the logic component 12$l$ and the modulator 12$m$ are connected to the output of the rectifier 20.

In this case, it is also possible to couple to the resonant circuit a bridge rectifier instead of a simple rectifier diode, and thus to use both half-cycles for the power supply of the logic component and of the modulator. Furthermore, it is also possible to arrange, between modulator and logic component, an additional storage capacitor protected against discharge with respect to the modulator by means of a diode, said storage capacitor effecting a reliable and constant power supply of the logic component.

Furthermore, it is possible, as indicated in FIG. 2, to arrange the modulator 12$m$ downstream of the rectifier 20 or upstream of the rectifier 20 (represented by dashed lines).

The output of the logic component is connected to the input of the modulator 12$m$. In this way, the information stored in the logic component 12$l$ is transmitted to the modulator 12$m$.

The exemplary embodiment illustrated in FIG. 2 involves load modulation of the carrier signal, that is to say that the amplitude of the high-frequency carrier signal is modulated.

Figure 3:
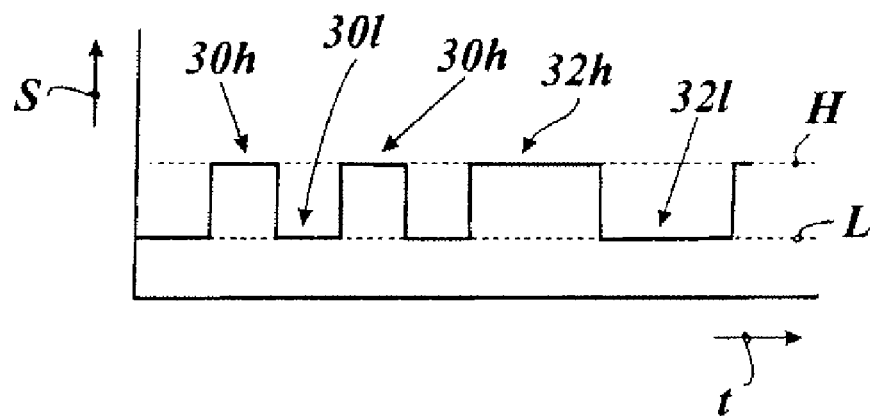
FIG. 3 shows a basic illustration of a modulation diagram according to the prior art.

FIG. 3 then shows a modulation diagram according to the prior art. The signal level S can assume the values L for the low level and H for the high level, tantamount to the binary signals 0 and 1. FIG. 3 illustrates the binary character sequence 10101100, where a binary 1 is designated by 30$h$, a binary 0 is designated by 30$l$ and two successive binary 1s are designated by 32$h$ and two successive 0s are designated by 32$l$. In this way, a time corresponding to the number of binary characters or bits is required for the transmission of a binary character sequence.

Figure 4:
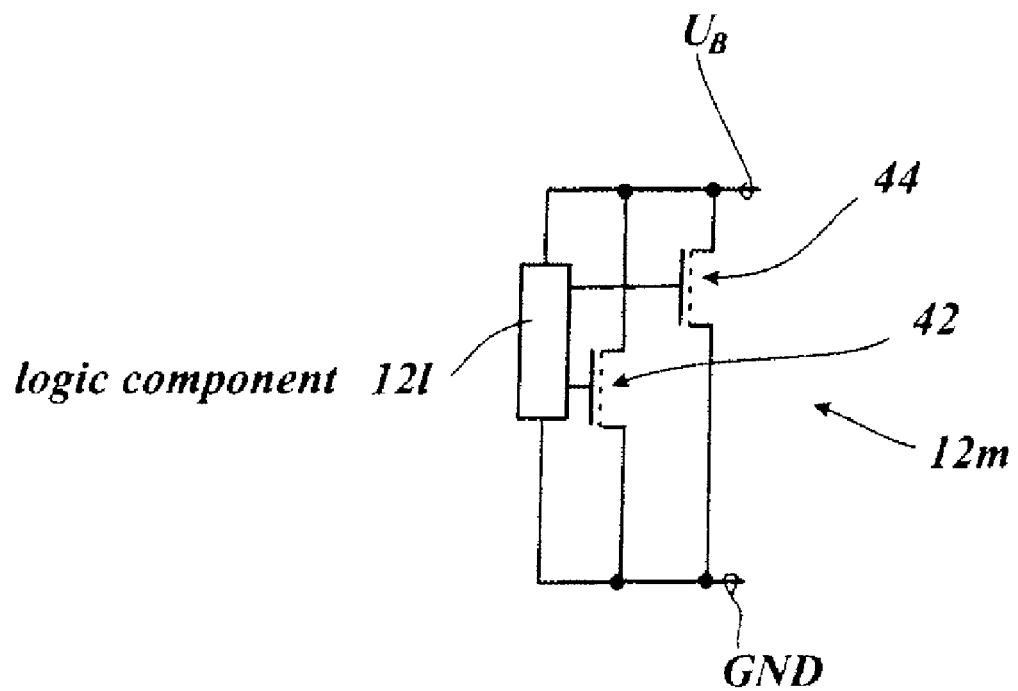
FIG. 4 shows a basic circuit diagram of a modulator for a first exemplary embodiment of the invention.

FIG. 4 shows a first exemplary embodiment of a modulator 12$m$, formed as a parallel connection of two OFETs 42 and 44 having different characteristic curves.

The two gates of the OFETs 42, 44 are connected to the two outputs of the logic component 12$l$. The two sources of the OFETs 42, 44 are connected to a ground line GND, and the two drains of the OFETs 42, 44 are connected to an operating voltage $U_B$.

Figure 5:
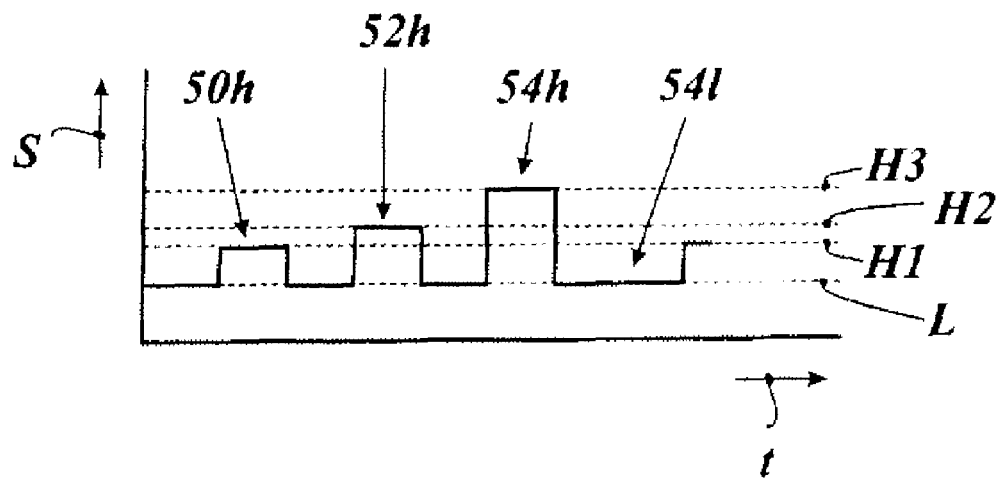
FIG. 5 shows a first modulation diagram, in particular of the modulator according to FIG. 4.

FIG. 5 then shows a first modulation diagram that can be formed by means of a circuit arrangement according to FIG. 4. It may be provided that the two parallel-connected OFETs 42 and 44 are formed with a different resistance profile. For this purpose, it may be provided, for example, that the first OFET is formed with a first geometry, for example with a first channel cross-section, and the second OFET is formed with a second geometry, for example with a second channel cross-section. In this way, a different forward resistance is formed for the same gate-source voltage.

If, therefore, as illustrated in FIG. 5, firstly only the first OFET 42 is driven, a signal 50$h$ having a signal level H1 is formed. In the case where only the second OFET 44 is driven, a signal 52$h$ having a signal level H2 is formed. If both OFETs 42, 44 are driven, a signal 54$h$ having a signal level H3 is formed. In the exemplary embodiment illustrated, the following relationship holds true between the signal levels H1 to H3:

L<H1<H2<H3.

If neither of the two OFETs is driven, a signal having a low signal level L is formed.

In this way, the amount of information that can be transmitted within a time period is increased since the number space that can be transmitted is now extended from 0, 1 to 0, 1, 2, 3. A transformation of the number system is therefore possible in this way. The use of more than two parallel OFETs may be provided in this case. By way of example, three parallel-connected OFETs may be provided in order to code an octal signal. If n parallel-connected OFETs are provided, $2^n$ different signal levels can be transmitted.

In this case, it is advantageous for the forward resistances of the different OFETS to be chosen such that the $2^n$ different signal levels succeed one another equidistantly. The resultant signal level in each case for the different switching states of the n different OFETs is in this case calculated from the sum of the conductances of the individual OFETs.

It may also be provided, however, that the first and the second OFET are formed with identical geometry and have different gate-source voltages applied to them, with the result that a different resistance is formed between drain and source electrodes of the two OFETs. Provision may also be made for operating a plurality of OFETs with different geometries and different gate-source voltages.

Figure 6:
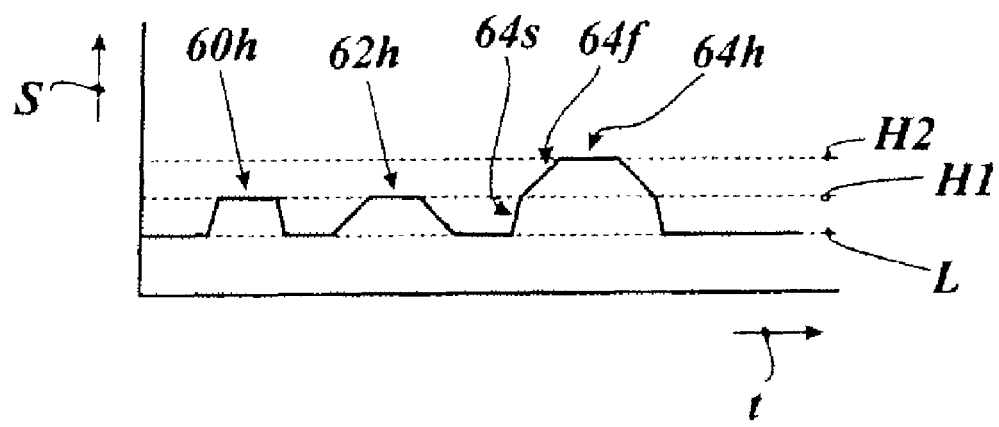
FIG. 6 shows a second modulation diagram, in particular of the modulator according to FIG. 4.

FIG. 6 then shows a modulation diagram with edge steepness modulation. Whereas in the exemplary embodiment according to FIG. 5 the information is coded into the amplitude value and the steepness of the edges is not accorded any significance, in the exemplary embodiment according to FIG. 6 the different rise times of different OFETs that result during the transition from the low level to the high level are deliberately utilized for information coding.

In order to form the edge steepness modulation illustrated in FIG. 6, it is provided that the two OFETS 42 and 44 according to FIG. 4 have a different switching behavior. This can be achieved for example by means of differently formed semiconductor material or by means of different channel lengths or a different channel width. If the first OFET 42 formed with a short rise time is driven, a high signal 60h having steep edges is formed. If the second OFET 44 formed with a long rise time is driven, a high signal 62h having shallow edges is formed. In the case where both OFETs 42, 44 are driven simultaneously, a high signal 64h results which has a first steep partial edge 64s and a second shallow partial edge 64f and a signal amplitude formed as the sum of the two signal amplitudes of the two OFETs 42, 44. As can be discerned in FIG. 6, the high signal 64h is formed with double amplitude since it results from the superposition of the high signals 60h and 62h. Four states of the carrier signal can once again be formed by means of two differently formed OFETs, the modulated carrier signal being redundant on account of the simultaneous formation of different amplitudes and different signal edges.

The demodulation of the signal can thus be based on the average edge steepness, on the edge steepness in the leading region of the edge and/or on the maximum or average amplitude value.

In accordance with the exemplary embodiment according to FIG. 5, in this case as well it is possible to provide more than two parallel OFETs having a different switching behavior. If n parallel-connected OFETs are provided, $2^n$ different signal levels can be transmitted.

Furthermore, it is also possible to combine the exemplary embodiments according to FIG. 5 and FIG. 6 with one another and to connect up n different OFETS to one another in a parallel connection, which OFETs differ in each case among one another in terms of their forward resistance or their response characteristic.

Figure 7:
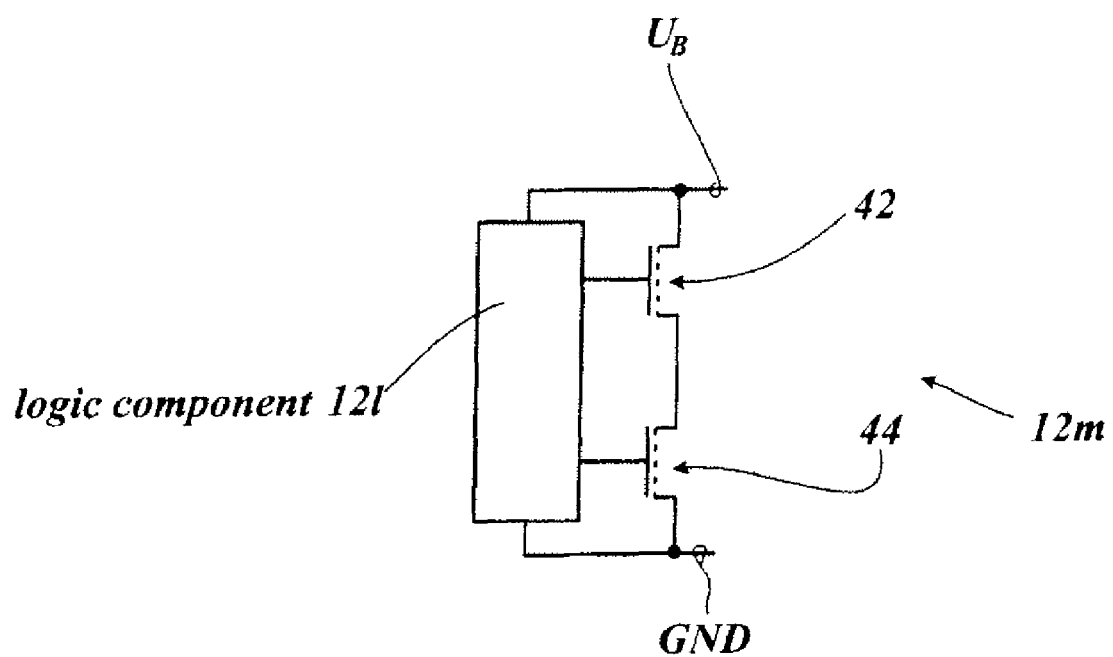
FIG. 7 shows a basic circuit diagram of a modulator for a second exemplary embodiment of the invention.

FIG. 7 shows a second exemplary embodiment of a modulator circuit. The two OFETs 42, 44 are now connected in series. The OFET 42 is connected by the drain to the operating voltage $U_B$ and by the source to the drain of the OFET 44. The source of the OFET 44 is connected to the ground line GND. The two outputs of the logic component 121 are connected to the two gates of the OFETs 42, 44.

This circuit arrangement can likewise be used for generating the signal shapes illustrated in FIGS. 5 and 6 if the reverse resistances of the OFETs 42 and 44 are chosen to be correspondingly low. The circuit arrangement illustrated in FIG. 4 may be preferred, however, if only a low operating voltage $U_B$ is provided.

It is also possible to provide circuit arrangements which combine parallel connection and series connection with one another.

The invention claimed is:

1. An electronic component comprising:
    an antenna, a capacitor, and a modulator for modulating a carrier signal and coupled in circuit with the antenna and the capacitor; and
    a rectifier having an output;
    the modulator being connected to the output of the rectifier, the modulator comprising at least two different organic field effect transistors each with different semiconductor layers wherein the at least two different organic field effect transistors have at least one of 1) different internal resistances in a turned-on or in a turned-off state or 2) a different switching behavior, and are connected in the electronic component to form a variable load for load modulation of the carrier signal.

2. The electronic component as claimed in claim 1 wherein the organic field effect transistors are connected in parallel and/or series.

3. The electronic component as claimed in claim 1 wherein the at least two different organic field effect transistors exhibit different edge forms when the input signal changes, which edge forms differ in edge steepness.

4. The electronic component as claimed in claim 1 wherein the at least two different organic field effect transistors are formed with different geometries.

5. The electronic component as claimed in claim 1 wherein the at least two different organic field transistors have semiconductor layers that differ in terms of at least one of their thickness, doping or conductivity.

6. The electronic component as claimed in claim 1 further including a binary logic circuit having outputs, wherein the at least two organic field effect transistors each have a gate, the gates of the organic field effect transistors being connected to the outputs of the binary logic circuit.

7. The electronic component as claimed in claim 6 wherein the binary logic circuit is an organic binary logic circuit.

8. The electronic component as claimed in claim 6 wherein the organic field effect transistors are driven by the binary logic circuit for the simultaneous transmission of two or more bits by multistage modulation.

9. The electronic component as claimed in claim 8 wherein the organic field effect transistors are formed by n different organic field effect transistors which are driven by the binary logic circuit for the simultaneous transmission of $2^n$ bits.

10. The electronic component as claimed in claim 9 wherein the n different organic field effect transistors have different internal resistances in the turned-on state and the n different organic field effect transistors are connected in parallel.

11. The electronic component as claimed in claim 9 wherein the n different organic field effect transistors have different edge forms during state transition and the n different organic field effect transistors are connected in parallel.

12. The electronic component as claimed in claim 1 wherein the organic field effect transistors are formed by at least one of printed-on semiconducting polymers, conductive printing inks or metallic layers.

13. The electronic component as claimed in claim 1 wherein the electronic component comprises a multilayer flexible film body.

14. A security document comprising:
   at least one of a valuable document, identity card, merchandize label or ticket; and
   comprising an electronic component as claimed in claim 1.

15. An electronic component comprising:
   an antenna, a capacitor, and a modulator for modulating a carrier signal and coupled in circuit with the antenna and the capacitor; and
   a rectifier having an output;
   the modulator being connected to the output of the rectifier, the modulator comprising at least two different organic field effect transistors, wherein the at least two different organic field effect transistors have semiconductor layers having respective different geometries, and having different internal resistances in a turned-on or in a turned-off state and are connected in the electronic component to form a variable load for load modulation of the carrier signal.

16. An electronic component comprising:
   an antenna, a capacitor, and a modulator for modulating a carrier signal and coupled in circuit with the antenna and the capacitor; and
   a rectifier having an output;
   the modulator being connected to the output of the rectifier, the modulator comprising at least two different organic field effect transistors, each with different semiconductor layers having different geometries and wherein the at least two different organic field effect transistors having a different switching behavior, and are connected in the electronic component to form a variable load for load modulation of the carrier signal.

* * * * *